US009949071B2

(12) United States Patent
Ouyang (10) Patent No.: US 9,949,071 B2
(45) Date of Patent: Apr. 17, 2018

(54) METHOD AND DEVICE OF PROVIDING CONTACT BASED ON GEOGRAPHICAL POSITION INFORMATION (71) Applicant: BAIDU ONLINE NETWORK TECHNOLOGY (BEIJING) CO., LTD., Beijing (CN)

(72) Inventor: Liping Ouyang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/392,250

(22) PCT Filed: Oct. 11, 2014

(86) PCT No.: PCT/CN2014/088415
§ 371 (c)(1),
(2) Date: Dec. 24, 2015

(87) PCT Pub. No.: WO2015/032365
PCT Pub. Date: Mar. 12, 2015

(65) Prior Publication Data
US 2016/0255468 A1  Sep. 1, 2016

(51) Int. Cl.
H04M 3/42 (2006.01)
H04W 4/02 (2018.01)
(Continued)

(52) U.S. Cl.
CPC ......... *H04W 4/021* (2013.01); *H04L 61/1594* (2013.01); *H04W 4/206* (2013.01); *H04W 68/04* (2013.01)

(58) Field of Classification Search
None
See application file for complete search history.

(56) References Cited

U.S. PATENT DOCUMENTS

2007/0036137 A1  2/2007 Horner
2007/0249327 A1  10/2007 Nurmi
(Continued)

FOREIGN PATENT DOCUMENTS

CN  101720055 A  6/2010
CN  101873525 A  10/2010
(Continued)

OTHER PUBLICATIONS

PCT/CN2014/088415 English Translation of the International Search Report dated Jan. 12, 2015, 3 pages.
(Continued)

Primary Examiner — Suhail Khan
(74) Attorney, Agent, or Firm — Lathrop Gage LLP (57) ABSTRACT A method and device of providing a contact based on geographical position information are provided. The method includes: detecting current geographical position information of a mobile terminal; obtaining a contact list in the mobile terminal if it is determined that the mobile terminal enters a new region according to the current geographical position information, in which the contact list comprises contacts and geographical position information corresponding to the contacts; and obtaining a contact whose geographical position information belongs to the new region from the contact list, and providing the contact to the mobile terminal.

9 Claims, 2 Drawing Sheets (51) Int. Cl.
*H04W 4/20* (2018.01)
*H04L 29/12* (2006.01)
*H04W 68/04* (2009.01)

(56) References Cited

U.S. PATENT DOCUMENTS

| | | | |
|---|---|---|---|
| 2009/0300010 A1* | 12/2009 | Ratnakar | G06Q 30/02 |
| 2010/0144331 A1* | 6/2010 | Koberg | H04M 1/274583 |
| | | | 455/418 |
| 2010/0151883 A1 | 6/2010 | Soundararajan | |
| 2011/0098061 A1* | 4/2011 | Yoon | G06Q 10/06 |
| | | | 455/456.3 |
| 2012/0127259 A1 | 5/2012 | Mackie et al. | |
| 2013/0331127 A1* | 12/2013 | Sabatelli | H04W 4/021 |
| | | | 455/456.3 |
| 2014/0177812 A1* | 6/2014 | Barrett | H04M 11/04 |
| | | | 379/47 |
| 2015/0032542 A1* | 1/2015 | Thakar | H04W 4/02 |
| | | | 705/14.58 |

FOREIGN PATENT DOCUMENTS

| | | |
|---|---|---|
| CN | 101924989 A | 12/2010 |
| CN | 101945331 A | 1/2011 |
| CN | 102300000 A | 12/2011 |
| CN | 102368838 A | 3/2012 |
| CN | 103079164 A | 5/2013 |
| CN | 103458365 A | 12/2013 |

OTHER PUBLICATIONS

PCT/CN2014/088415 Written Opinion the International Search Authority with English translation, dated Dec. 1, 2014, 14 pages.
European Patent Application 14841708.2, extended Search Report dated Jan. 25, 2015; 7 pages.
Chinese Patent Application No. 201310407110.5 First Office Action with English translation, dated Sep. 14, 2015, 15 pages.
Chinese Patent Application No. 201310407110.5 Second Office Action with English translation, dated Mar. 30, 2016, 11 pages.
Chinese Patent Application No. 201310407110.5 Decision on Rejection dated Oct. 11, 2016, with English translation, 12 pages.

* cited by examiner

METHOD AND DEVICE OF PROVIDING CONTACT BASED ON GEOGRAPHICAL POSITION INFORMATION

CROSS-REFERENCE TO RELATED APPLICATIONS

This application is a national phase entry under 35 USC § 371 of International Application PCT/CN2014/088415, filed Oct. 11, 2014, which claims priority to Chinese Patent Application No. 201310407110.5, named as "method and device of providing a contact based on geographical position information", filed on Sep. 9, 2013 by BAIDU ONLINE NETWORK TECHNOLOGY (BEIJING) CO., LTD, the entire contents of which are incorporated herein by reference.

FIELD

The present disclosure relates to a field of mobile terminal communication technology, and more particularly relates to a method and device of providing a contact based on geographical position information.

BACKGROUND

In the related art, a mobile terminal may store and query contacts by classifying the geographical positions. For example, the contacts are classified according to provinces or municipal districts. When requiring a number of a contact in a province or a municipal district, a user may query local contacts according to the geographical information. However, there is a defect that, the mobile terminal cannot automatically remind the user of the related contacts in a region where the mobile terminal is or a new region where the mobile terminal enters, and the user needs to initiate a query actively, lacking of convenience, flexibility and usability of obtaining the information of contacts in the mobile terminal.

SUMMARY

The present disclosure is aimed to solve at least one of the above problems.

Accordingly, a first objective of the present disclosure is to provide a method of providing a contact based on geographical position information. With the method, the mobile terminal may find a contact belonging to a new region in the contact list automatically after the user arrives at the new region. The method is efficient, effective and easy to implement.

A second objective of the present disclosure is to provide a device of a contact based on geographical position information.

A third objective of the present disclosure is to provide a computer storage medium.

A fourth objective of the present disclosure is to provide a device.

In order to achieve the above objectives, embodiments of a first aspect of the present disclosure provide a method of providing a contact based on geographical position information. The method includes: detecting current geographical position information of a mobile terminal; obtaining a contact list in the mobile terminal if it is determined that the mobile terminal enters a new region according to the current geographical position information, in which the contact list comprises contacts and geographical position information corresponding to the contacts; and obtaining a contact whose geographical position information belongs to the new region from the contact list, and providing the contact to the mobile terminal.

With the method of providing a contact based on geographical position information according to embodiments of the present disclosure, if it is detected that the mobile terminal enters the new region, a query is initiated in the contact list according to the current geographical position information of the mobile terminal to obtain the contact belonging to the new region, and then the contact is provided to the mobile terminal. With the method, after the user arrives at the new region, the mobile terminal may find the contact belonging to the new region in the contact list automatically to help the user to quickly obtain the contact, and may further remind the user, such that the user does not need to actively search the contact list by the mobile terminal. The method is efficient, effective and easy to implement.

Embodiments of a second aspect of the present disclosure provide a device of providing a contact based on geographical position information. The device includes: a detecting module, configured to detect current geographical position information of a mobile terminal; a first obtaining module, configured to obtain a contact list in the mobile terminal if it is determined that the mobile terminal enters a new region according to the current geographical position information, in which the contact list comprises contacts and geographical position information corresponding to the contacts; a second obtaining module, configured to obtain a contact whose geographical position information belongs to the new region from the contact list; and a providing module, configured to provide the contact to the mobile terminal.

With the device of providing a contact based on geographical position information according to embodiments of the present disclosure, if it is detected that the mobile terminal enters the new region, a query is initiated in the contact list according to the current geographical position information of the mobile terminal to obtain the contact belonging to the new region, and then the contact is provided to the mobile terminal. With the device, after the user arrives at the new region, the mobile terminal may find the contact belonging to the new region in the contact list automatically to help the user to quickly obtain the contact, and may further remind the user, such that the user does not need to actively search the contact list by the mobile terminal. The device is efficient, effective and easy to use.

In order to achieve the above objectives, embodiments of a third aspect of the present disclosure provide a computer storage medium, coded with a computer program that, when executed by one or more computers, causes the one or more computers to perform following operations of: detecting current geographical position information of a mobile terminal; obtaining a contact list in the mobile terminal if it is determined that the mobile terminal enters a new region according to the current geographical position information, in which the contact list comprises contacts and geographical position information corresponding to the contacts; and obtaining a contact whose geographical position information belongs to the new region from the contact list, and providing the contact to the mobile terminal.

With the computer storage medium according to embodiments of the present disclosure, if one or more computers that execute computer programs stored in the computer storage medium detect that the mobile terminal enters the new region, a query is initiated in the contact list according to the current geographical position information of the mobile terminal to obtain the contact belonging to the new region, and then the contact is provided to the mobile terminal. With the device, after the user arrives at the new region, the mobile terminal may find the contact belonging to the new region in the contact list automatically to help the user to quickly obtain the contact, and may further remind the user, such that the user does not need to actively search the contact list by the mobile terminal. The device is efficient, effective and easy to use.

In order to achieve the above objectives, embodiments of a fourth aspect of the present disclosure provide a device. The device includes at least one processor, a memory, and at least one computer program stored in the memory and executed by the at least one processor, in which the at least one computer program includes following instructions for performing following operations of: detecting current geographical position information of a mobile terminal; obtaining a contact list in the mobile terminal if it is determined that the mobile terminal enters a new region according to the current geographical position information, in which the contact list comprises contacts and geographical position information corresponding to the contacts; and obtaining a contact whose geographical position information belongs to the new region from the contact list, and providing the contact to the mobile terminal.

With the device according to embodiments of the present disclosure, if it is detected that the mobile terminal enters the new region, a query is initiated in the contact list according to the current geographical position information of the mobile terminal to obtain the contact belonging to the new region, and then the contact is provided to the mobile terminal. With the device, after the user arrives at the new region, the mobile terminal may find the contact belonging to the new region in the contact list automatically to help the user to quickly obtain the contact, and may further remind the user, such that the user does not need to actively search the contact list by the mobile terminal. The device is efficient, effective and easy to use.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In addition, terms such as "first" and "second" are used herein for purposes of description and are not intended to indicate or imply relative importance or significance. In the description of the present disclosure, it should be understood that, unless specified or limited otherwise, terms such as "connected" and "coupled" should be understood broadly, and may be, for example, fixed connections, detachable connections, or integral connections; or may be mechanical or electrical connections; or may be direct connections or indirect connections via intervening structures, which can be understood by those skilled in the art according to specific situations. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. Moreover, the scope of a preferred embodiment of the present disclosure includes other implementations in which the order of execution may differ from that which is depicted in the flow chart, which should be understood by those skilled in the art.

The method and device of providing a contact based on geographical position information according to embodiments of the present disclosure will be described with reference to drawings.

At present, when a mobile terminal enters a new region, if a user wants to know which contact belongs to the new region, the user needs to check the contact list in the mobile terminal, which results in a problem of inconvenience, lack of flexibility and utility. In order to solve the above problem, the present disclosure provides a method of providing a contact based on geographical position information. The method includes: detecting current geographical position information of a mobile terminal; obtaining a contact list in the mobile terminal if it is determined that the mobile terminal enters a new region according to the current geographical position information, in which the contact list comprises contacts and geographical position information corresponding to the contacts; and obtaining a contact whose geographical position information belongs to the new region from the contact list, and providing the contact to the mobile terminal.

Figure 1:
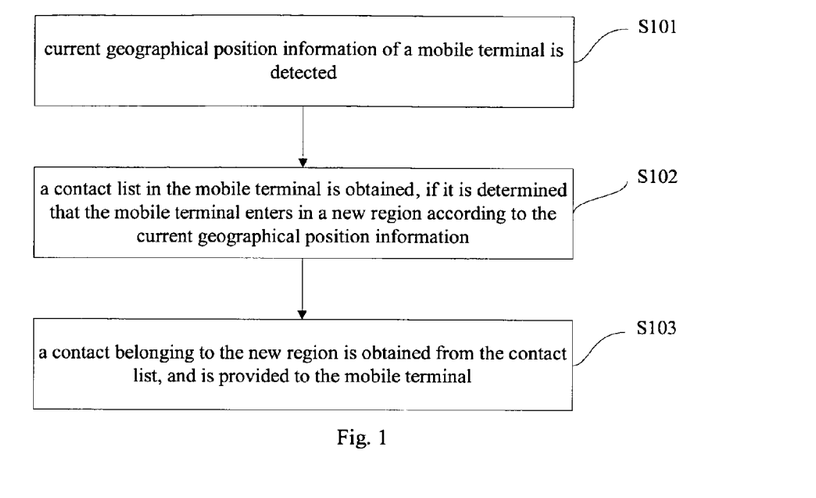
FIG. 1 is a flow chart of a method of providing a contact based on geographical position information according to an embodiment of the present disclosure.

FIG. 1 is a flow chart of a method of providing a contact based on geographical position information according to an embodiment of the present disclosure.

As shown in FIG. 1, the method of providing a contact based on geographical position information includes following steps.

In step S101, current geographical position information of a mobile terminal is detected.

Specifically, for the mobile terminal, there are many ways to obtain the geographical position information. For example, the geographical position information may be obtained by using information of a communication base station corresponding to the mobile terminal. The communication base station is an entry connecting the mobile terminal with the communication network. A coverage area of each communication base station ranges from hundred meters to thousand meters and each communication base station has specific geographical position information. With regard to a province or a municipal district, the distance error of thousand meters is within the error range, which is acceptable. Thus, the region where the mobile terminal is may be completely indicated by the information of the base station, and finally the specific geographical position information of the mobile terminal may be obtained. The way of obtaining the geographical position information of the mobile terminal provided in the present disclosure includes, but is not limited to, the above example. For example, ways of obtaining exactly by a global positioning system (GPS) the geographical position information of the mobile terminal, or obtaining the geographical position information of the mobile terminal through information of an entry of Wireless Fidelity (WiFi) may be used.

It should be noted that, the way of obtaining the geographical position information of the mobile terminal based on the information of the communication base station is preferred, because the GPS is not required to open, and thus the energy consumption of the mobile terminal may be reduced effectively, the amount of data flow may be reduced, and the speed is fast.

In step S102, a contact list in the mobile terminal is obtained, if it is determined that the mobile terminal enters in a new region according to the current geographical position information, in which the contact list includes contacts and geographical position information corresponding to the contacts.

After obtaining the current geographical position information, it is judged whether the mobile terminal enters the new region (such as, a new province, a new municipal district, etc) by querying and matching.

Specifically, the contact list in the mobile terminal stores contacts and information about the contacts, such as phone numbers (e.g., mobile phone number, fixed phone number, etc.). Firstly, the phone numbers of the contacts are analyzed to obtain the geographical position information of the contacts.

More specifically, the phone number of each contact has a specific registration location. With regard to the fixed phone number, the area code and station code may be obtained by analyzing the fixed phone number. Moreover, the province and municipal district where the fixed phone number is may be obtained by querying the area code, and then the region where the fixed phone number is may be determined according to the station code, i.e. the specific geographical position information of the fixed phone number may be obtained finally. In most situations, it is just required to obtain the area code, and the province or municipal district where the fixed phone number is may be obtained as the geographical position information. For example, the fixed phone number beginning with "010" is a phone number in Beijing.

With regard to the mobile phone number, a mapping relationship between the mobile phone number and the geographical position information may be established by combining data tables of the operator. For example, Wang, 13593449902, it may be determined that this number is from Hangzhou, Zhejiang according to the first seven numbers. The mobile phone number may be obtained using the above method, but is not limited thereto.

Further, after the mobile terminal receives a touch instruction from the user, the contact list is analyzed according to the phone numbers of the contacts to obtain the corresponding geographical position information, and then the contact list may be shown to the user (by classifying the contacts in a same region into a group according to the geographical position information). The touch instruction may be an instruction generated when the mobile terminal receives a touch action from the user, and the touch action may be an action of clicking a button on the mobile terminal or sliding a finger on the touch screen of the mobile terminal, to input the touch instruction. The touch action is not limited to the above ways.

In step S103, a contact belonging to the new region is obtained from the contact list, and is provided to the mobile terminal.

In an embodiment of the present disclosure, the contact located in the new region may be provided to the mobile terminal by one or more ways of popping up a dialog, audio broadcasting, sending a message. Thus, the variety of providing the contact in the new region to the user is improved.

With the method of providing a contact based on geographical position information according to embodiments of the present disclosure, if it is detected that the mobile terminal enters the new region, a query is initiated in the contact list according to the current geographical position information of the mobile terminal to obtain the contact belonging to the new region, and then the contact is provided to the mobile terminal. With the method, after the user arrives at the new region, the mobile terminal may find the contact belonging to the new region in the contact list automatically to help the user to quickly obtain the contact, and may further remind the user, such that the user does not need to actively search the contact list by the mobile terminal. The method is efficient, effective and easy to implement.

Figure 2:
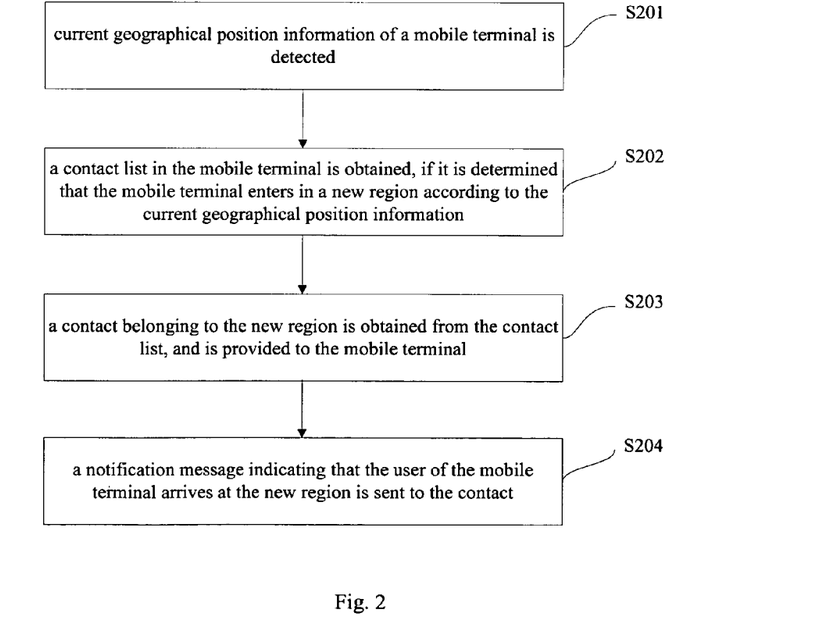
FIG. 2 is a flow chart of a method of providing a contact based on geographical position information according to another embodiment of the present disclosure.

After obtaining the contact in the new region, reminding messages may be sent to the contacts. FIG. 2 is a flow chart of the method of providing a contact based on geographical position information according to another embodiment of the present disclosure.

As shown in FIG. 2, the method of providing a contact based on geographical position information includes following steps.

In step S201, current geographical position information of a mobile terminal is detected.

Specifically, for the mobile terminal, there are many ways to obtain the geographical position information. For example, the geographical position information may be obtained by using information of a communication base station corresponding to the mobile terminal. The communication base station is an entry connecting the mobile terminal with the communication network. A coverage area of each communication base station ranges from hundred meters to thousand meters and each communication base station has specific geographical position information. With regard to a province or a municipal district, the distance error of thousand meters is within the error range, which is acceptable. Thus, the region where the mobile terminal is may be completely indicated by the information of the base station, and finally the specific geographical position information of the mobile terminal may be obtained. The way of obtaining the geographical position information of the mobile terminal provided in the present disclosure includes, but is not limited to, the above example. For example, ways of obtaining exactly by a global positioning system (GPS) the geographical position information of the mobile terminal, or obtaining the geographical position information of the mobile terminal through information of an entry of Wireless Fidelity (WiFi) may be used.

It should be noted that, the way of obtaining the geographical position information of the mobile terminal based on the information of the communication base station is preferred, because the GPS is not required to open, and thus the energy consumption of the mobile terminal may be reduced effectively, the amount of data flow may be reduced, and the speed is fast.

In step S202, a contact list in the mobile terminal is obtained, if it is determined that the mobile terminal enters in a new region according to the current geographical position information, in which the contact list includes contacts and geographical position information corresponding to the contacts.

After obtaining the current geographical position information, it is judged whether the mobile terminal enters the new region (such as, a new province, a new municipal district, etc) by querying and matching.

Specifically, the contact list in the mobile terminal stores contacts and information about the contacts, such as phone numbers (e.g., mobile phone number, fixed phone number, etc.). Firstly, the phone numbers of the contacts are analyzed to obtain the geographical position information of the contacts.

More specifically, the phone number of each contact has a specific registration location. With regard to the fixed phone number, the area code and station code may be obtained by analyzing the fixed phone number. Moreover, the province and municipal district where the fixed phone number is may be obtained by querying the area code, and then the region where the fixed phone number is may be determined according to the station code, i.e. the specific geographical position information of the fixed phone number may be obtained finally. In most situations, it is just required to obtain the area code, and the province or municipal district where the fixed phone number is may be obtained as the geographical position information. For example, the fixed phone number beginning with "010" is a phone number in Beijing.

With regard to the mobile phone number, a mapping relationship between the mobile phone number and the geographical position information may be established by combining data tables of the operator. For example, Wang, 13593449902, it may be determined that this number is from Hangzhou, Zhejiang according to the first seven numbers. The mobile phone number may be obtained using the above method, but is not limited thereto.

Further, after the mobile terminal receives a touch instruction from the user, the contact list is analyzed according to the phone numbers of the contacts to obtain the corresponding geographical position information, and then the contact list may be shown to the user (by classifying the contacts in a same region into a group according to the geographical position information). The touch instruction may be an instruction generated when the mobile terminal receives a touch action from the user, and the touch action may be an action of clicking a button on the mobile terminal or sliding a finger on the touch screen of the mobile terminal, to input the touch instruction. The touch action is not limited to the above ways.

In step S203, a contact belonging to the new region is obtained from the contact list, and is provided to the mobile terminal.

In an embodiment of the present disclosure, the contact located in the new region may be provided to the mobile terminal by one or more ways of popping up a dialog, audio broadcasting, sending a message. Thus, the variety of providing the contact in the new region to the user is improved.

In step S204, a notification message indicating that the user of the mobile terminal arrives at the new region is sent to the contact.

Specifically, after the mobile terminal obtains the contact in the new region, the notification message may be actively sent to the contact to enhance the relationship between the user and the contact, such that the contact may know that the user has entered the new region without notifying by the user, thus improving the user experience.

In addition, sometimes the user may not want part of the contacts in the new region to know his/her travel, at this time a filter operation is required to be performed before sending the notification message. Specifically, in an embodiment of the present disclosure, before sending the notification message to the contact belonging to the new region, the method further includes judging whether the contact is in a shielding list, in which the shielding list may be a blacklist, or a shielding list newly established by the user, and contacts in the shielding list are not close to the user, for example, a contact contacted only few times, or a contact just having a work relationship with the user. If the contact is in the shielding list, the notification message is blocked. If the contact is not in the shielding list, the notification message is sent. Thus, the user experience is further improved.

In addition, the social network is more and more popular. The user may send his/her own information to the social network whenever and wherever he/she likes. Thus, the method according to embodiments of the present disclosure further includes displaying by the mobile terminal a prompt message to the user, in which the prompt message is used for prompting the user to send the new region to the social network. For example, the mobile terminal provides a prompt message asking the user whether to publish the new region, for example, by a button, if the user clicks the publishing button, the mobile terminal actively publishes the new region to the social network.

With the method of providing a contact based on geographical position information according to embodiments of the present disclosure, if it is detected that the mobile terminal enters the new region, a query is initiated in the contact list according to the current geographical position information of the mobile terminal to obtain the contact belonging to the new region, and then the contact is provided to the mobile terminal. Further, the notification message indicating that the user arrives at the new region may be sent to the contact, and a message indicating that the user arrives at the new region may be published to the social network. With the method, on one hand, after the user arrives at the new region, the mobile terminal may find the contact belonging to the new region in the contact list automatically to help the user to quickly obtain the contact, and may further remind the user, such that the user does not need to actively search the contact list by the mobile terminal, and thus the method is efficient, effective and easy to implement; on the other hand, a status indicating the mobile terminal enters the new region is sent to the contact in the new region or published to the social network, such that the user experience is improved, and the contact may obtain the status at any time, and thus the method is real-time, efficient and easy to implement.

Figure 3:
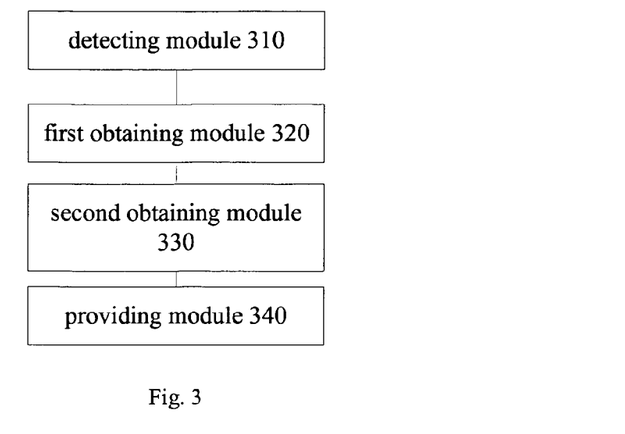
FIG. 3 is a block diagram of a device of providing a contact based on geographical position information according to an embodiment of the present disclosure.

FIG. 3 is a block diagram of a device of providing a contact based on the geographical position information according to an embodiment of the present disclosure.

As shown in FIG. 3, the device 30 of providing a contact based on the geographical position information includes a detecting module 310, a first obtaining module 320, a second obtaining module 330 and a providing module 340.

Specifically, the detecting module 310 is configured to detect current geographical position information of a mobile terminal.

More specifically, for the mobile terminal, the detecting module 310 may obtain the geographical position information by many ways. For example, the detecting module 310 may obtain the geographical position information by using information of a communication base station corresponding to the mobile terminal. The communication base station is an entry connecting the mobile terminal with the communication network. A coverage area of each communication base station ranges from hundred meters to thousand meters and each communication base station has specific geographical position information. With regard to a province or a municipal district, the distance error of thousand meters is within the error range, which is acceptable. Thus, the region where the mobile terminal is may be completely indicated by the information of the base station, and finally the specific geographical position information of the mobile terminal may be obtained. The way of obtaining the geographical position information of the mobile terminal provided in the present disclosure includes, but is not limited to, the above example. For example, the detecting module 310 may also use a global positioning system (GPS) to exactly obtain the geographical position information of the mobile terminal, or may obtain the geographical position information of the mobile terminal through information of an entry of Wireless Fidelity (WiFi).

It should be noted that, preferably, the detecting module 310 may obtain the geographical position information of the mobile terminal based on the information of the communication base station, because the GPS is not required to open, and thus the energy consumption of the mobile terminal may be reduced effectively, the amount of data flow may be reduced, and the speed is fast.

The first obtaining module 320 is configured to obtain a contact list in the mobile terminal, if it is determined that the mobile terminal enters in a new region according to the current geographical position information, in which the contact list includes contacts and geographical position information corresponding to the contacts. The contact list in the mobile terminal stores contacts and information about the contacts, such as phone numbers (e.g., mobile phone number, fixed phone number, etc.).

Firstly, the phone numbers of the contacts are analyzed to obtain the geographical position information of the contacts. More specifically, the phone number of each contact has a specific registration location. With regard to the fixed phone number, the area code and station code may be obtained by analyzing the fixed phone number. Moreover, the province and municipal district where the fixed phone number is may be obtained by querying the area code, and then the region where the fixed phone number is may be determined according to the station code, i.e. the specific geographical position information of the fixed phone number may be obtained finally. In most situations, it is just required to obtain the area code, and the province or municipal district where the fixed phone number is may be obtained as the geographical position information. For example, the fixed phone number beginning with "010" is a phone number in Beijing.

With regard to the mobile phone number, a mapping relationship between the mobile phone number and the geographical position information may be established by combining data tables of the operator. For example, Wang, 13593449902, it may be determined that this number is from Hangzhou, Zhejiang according to the first seven numbers. The mobile phone number may be obtained using the above method, but is not limited thereto.

Further, after the first obtaining module 320 receives a touch instruction from the user, the contact list is analyzed according to the phone numbers of the contacts to obtain the corresponding geographical position information, and then the contact list may be shown to the user (by classifying the contacts in a same region into a group according to the geographical position information). The touch instruction may be an instruction generated when the mobile terminal receives a touch action from the user, and the touch action may be an action of clicking a button on the mobile terminal or sliding a finger on the touch screen of the mobile terminal, to input the touch instruction. The touch action is not limited to the above ways.

The second obtaining module 330 is configured to obtain a contact belonging to the new region from the contact list.

The providing module 340 is configured to provide the contact to the mobile terminal. In an embodiment of the present disclosure, the providing module 340 provides the contact to the mobile terminal by one or more ways of popping up a dialog, audio broadcasting, sending a message. Thus, the variety of providing the contact in the new region to the user is improved.

With the device of providing a contact based on geographical position information according to embodiments of the present disclosure, if it is detected that the mobile terminal enters the new region, a query is initiated in the contact list according to the current geographical position information of the mobile terminal to obtain the contact belonging to the new region, and then the contact is provided to the mobile terminal. With the device, after the user arrives at the new region, the mobile terminal may find the contact belonging to the new region in the contact list automatically to help the user to quickly obtain the contact, and may further remind the user, such that the user does not need to actively search the contact list by the mobile terminal. The device is efficient, effective and easy to use.

Figure 4:
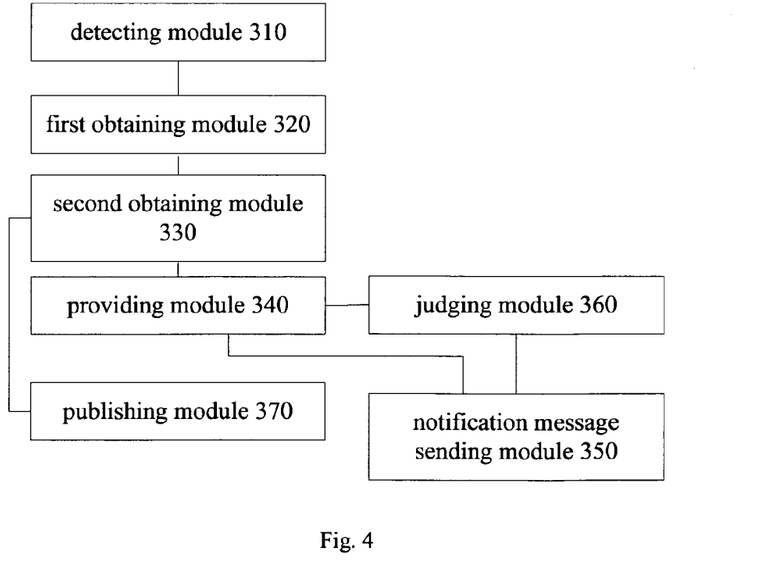
FIG. 4 is a block diagram of a device of providing a contact based on geographical position information according to another embodiment of the present disclosure.

FIG. 4 is a block diagram of a device of providing a contact based on geographical position information according to another embodiment of the present disclosure.

As shown in FIG. 4, based on the device 30 of providing a contact based on geographical position information, the device of providing a contact based on geographical position information further includes a notification message sending module 350, a judging module 360 and a publishing module 370.

Specifically, the notification message sending module 350 is configured to send a notification message indicating that the user of the mobile terminal arrives at the new region to the contact. More specifically, after the mobile terminal obtains the contact in the new region, the notification message may be actively sent to the contact by the notification message sending module 350 to enhance the relationship between the user and the contact, such that the contact may know that the user has entered the new region without notifying by the user, thus improving the user experience.

In addition, sometimes the user may not want part of the contacts in the new region to know his/her travel, at this time a filter operation is required to be performed before sending the notification message. Specifically, the device according to embodiments of the present disclosure further includes the judging module 360.

The judging module 360 is configured to judge whether the contact is in a shielding list, in which the shielding list may be a blacklist, or a shielding list newly established by the user, and contacts in the shielding list are not close to the user, for example, a contact contacted only few times, or a contact just having a work relationship with the user. The notification message sending module 350 is further configured to block the notification message if the judging module 360 determines that the contact is in the shielding list; and to send the notification message if the contact is not in the shielding list.

In addition, the social network is more and more popular. The user may send his/her own information to the social network whenever and wherever he/she likes. Thus, the device according to embodiments of the present disclosure further includes a displaying module 370, the displaying module 370 is configured to display a prompt message to the user, in which the prompt message is used for prompting the user to send the new region to the social network. For example, the mobile terminal provides a prompt message asking the user whether to publish the new region, for example, by a button, if the user clicks the publishing button, the mobile terminal actively publishes the new region to the social network.

With the device of providing a contact based on geographical position information according to embodiments of the present disclosure, if it is detected that the mobile terminal enters the new region, a query is initiated in the contact list according to the current geographical position information of the mobile terminal to obtain the contact belonging to the new region, and then the contact is provided to the mobile terminal. Further, the notification message indicating that the user arrives at the new region may be sent to the contact, and a message indicating that the user arrives at the new region may be published to the social network. With the device, on one hand, after the user arrives at the new region, the mobile terminal may find the contact belonging to the new region in the contact list automatically to help the user to quickly obtain the contact, and may further remind the user, such that the user does not need to actively search the contact list by the mobile terminal, and thus the device is efficient, effective and easy to use; on the other hand, a status indicating the mobile terminal enters the new region is sent to the contact in the new region or published to the social network, such that the user experience is improved, and the contact may obtain the status at any time, and thus the device is real-time, efficient and easy to use.

In order to implement the above embodiments, the present disclosure further provides a computer storage medium. The computer storage medium is coded with a computer program that, when executed by one or more computers, causes the one or more computers to perform following operations of: detecting current geographical position information of a mobile terminal; obtaining a contact list in the mobile terminal if it is determined that the mobile terminal enters a new region according to the current geographical position information, in which the contact list comprises contacts and geographical position information corresponding to the contacts; and obtaining a contact whose geographical position information belongs to the new region from the contact list, and providing the contact to the mobile terminal.

With the computer storage medium according to embodiments of the present disclosure, if one or more computers that execute computer programs stored in the computer storage medium detect that the mobile terminal enters the new region, a query is initiated in the contact list according to the current geographical position information of the mobile terminal to obtain the contact belonging to the new region, and then the contact is provided to the mobile terminal. With the device, after the user arrives at the new region, the mobile terminal may find the contact belonging to the new region in the contact list automatically to help the user to quickly obtain the contact, and may further remind the user, such that the user does not need to actively search the contact list by the mobile terminal. The device is efficient, effective and easy to use.

In order to achieve the above objectives, embodiments of a fourth aspect of the present disclosure provide a device. The device includes at least one processor, a memory, and at least one computer program stored in the memory and executed by the at least one processor, in which the at least one computer program includes following instructions for performing following operations of: detecting current geographical position information of a mobile terminal; obtaining a contact list in the mobile terminal if it is determined that the mobile terminal enters a new region according to the current geographical position information, in which the contact list comprises contacts and geographical position information corresponding to the contacts; and obtaining a contact whose geographical position information belongs to the new region from the contact list, and providing the contact to the mobile terminal.

With the device according to embodiments of the present disclosure, if it is detected that the mobile terminal enters the new region, a query is initiated in the contact list according to the current geographical position information of the mobile terminal to obtain the contact belonging to the new region, and then the contact is provided to the mobile terminal. With the device, after the user arrives at the new region, the mobile terminal may find the contact belonging to the new region in the contact list automatically to help the user to quickly obtain the contact, and may further remind the user, such that the user does not need to actively search the contact list by the mobile terminal. The device is efficient, effective and easy to use.

It will be understood that, the flow chart or any process or method described herein in other manners may represent a module, segment, or portion of code that comprises one or more executable instructions to implement the specified logic function(s) or that comprises one or more executable instructions of the steps of the progress. Moreover, the scope of a preferred embodiment of the present disclosure includes other implementations in which the order of execution may differ from that which is depicted in the flow chart, which should be understood by those skilled in the art.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the printer registrar for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method of providing a contact based on geographical position information, comprising:
    detecting current geographical position information of a mobile terminal;
    obtaining a contact list in the mobile terminal if it is determined that the mobile terminal enters a new region according to the current geographical position information, wherein the contact list is a local contact list that exists in the terminal before the terminal enters into the new region and the contact list comprises contacts and geographical position information corresponding to the contacts;
    obtaining a contact whose geographical position information belongs to the new region from the contact list, and providing the contact to a user of the mobile terminal;
    judging whether the contact is in a shielding list; and
    when the contact is not in the shielding list, sending a notification message to the contact;
    when the contact is in the shielding list, blocking the notification message;
    wherein the message indicates that a user of the mobile terminal arrives at the new region.

2. The method according to claim 1, wherein providing the contact to the mobile terminal comprises one or more of: popping up a dialog, audio broadcasting, sending a message.

3. The method according to claim 1, further comprising:
    displaying by the mobile terminal a prompt message to the user, wherein the prompt message is used for prompting the user to send the new region to a social network.

4. A device of providing a contact based on geographical position information, comprising:
    a detecting module, configured to detect current geographical position information of a mobile terminal;
    a first obtaining module, configured to obtain a contact list in the mobile terminal if it is determined that the mobile terminal enters a new region according to the current geographical position information, wherein the contact list is a local contact list that exists in the terminal before the terminal enters into the new region and the contact list comprises contacts and geographical position information corresponding to the contacts;
    a second obtaining module, configured to obtain a contact whose geographical position information belongs to the new region from the contact list;
    a providing module, configured to provide the contact to a user of the mobile terminal;
    a judging module, configured to judge whether the contact is in a shielding list; and
    a notification message sending module, configured to send a notification message to the contact when the contact is not in the shielding list, and to block the notification message if the judging module determines that the contact is in the shielding list;
    wherein the message indicates that a user of the mobile terminal arrives at the new region.

5. The device according to claim 4, wherein the providing module provides the contact to the mobile terminal by one or more ways of: popping up a dialog, audio broadcasting, sending a message.

6. The device according to claim 4, further comprising:
    a displaying module, configured to display a prompt message to the user, wherein the prompt message is used for prompting the user to send the new region to a social network.

7. A device, comprising at least one processor, a memory and at least one computer program stored in the memory and executed by the at least one processor;
    wherein the at least one computer program comprises instructions for performing following operations of:
    detecting current geographical position information of a mobile terminal;
    obtaining a contact list in the mobile terminal if it is determined that the mobile terminal enters a new region according to the current geographical position information, wherein the contact list is a local contact list that exists in the terminal before the terminal enters into the new region and the contact list comprises contacts and geographical position information corresponding to the contacts;

obtaining a contact whose geographical position information belongs to the new region from the contact list, and providing the contact to a user of the mobile terminal;

judging whether the contact is in a shielding list;

when the contact is not in the shielding list, sending a notification message to the contact, and when the contact is in the shielding list, blocking the notification message; wherein the message indicates that a user of the mobile terminal arrives at the new region.

8. The device according to claim 7, wherein providing the contact to the mobile terminal comprises one or more of: popping up a dialog, audio broadcasting, sending a message.

9. The device according to claim 7, wherein the at least one computer program further comprises instructions for performing an operation of:

displaying by the mobile terminal a prompt message to the user, wherein the prompt message is used for prompting the user to send the new region to a social network.

\* \* \* \* \*